UNITED STATES PATENT OFFICE.

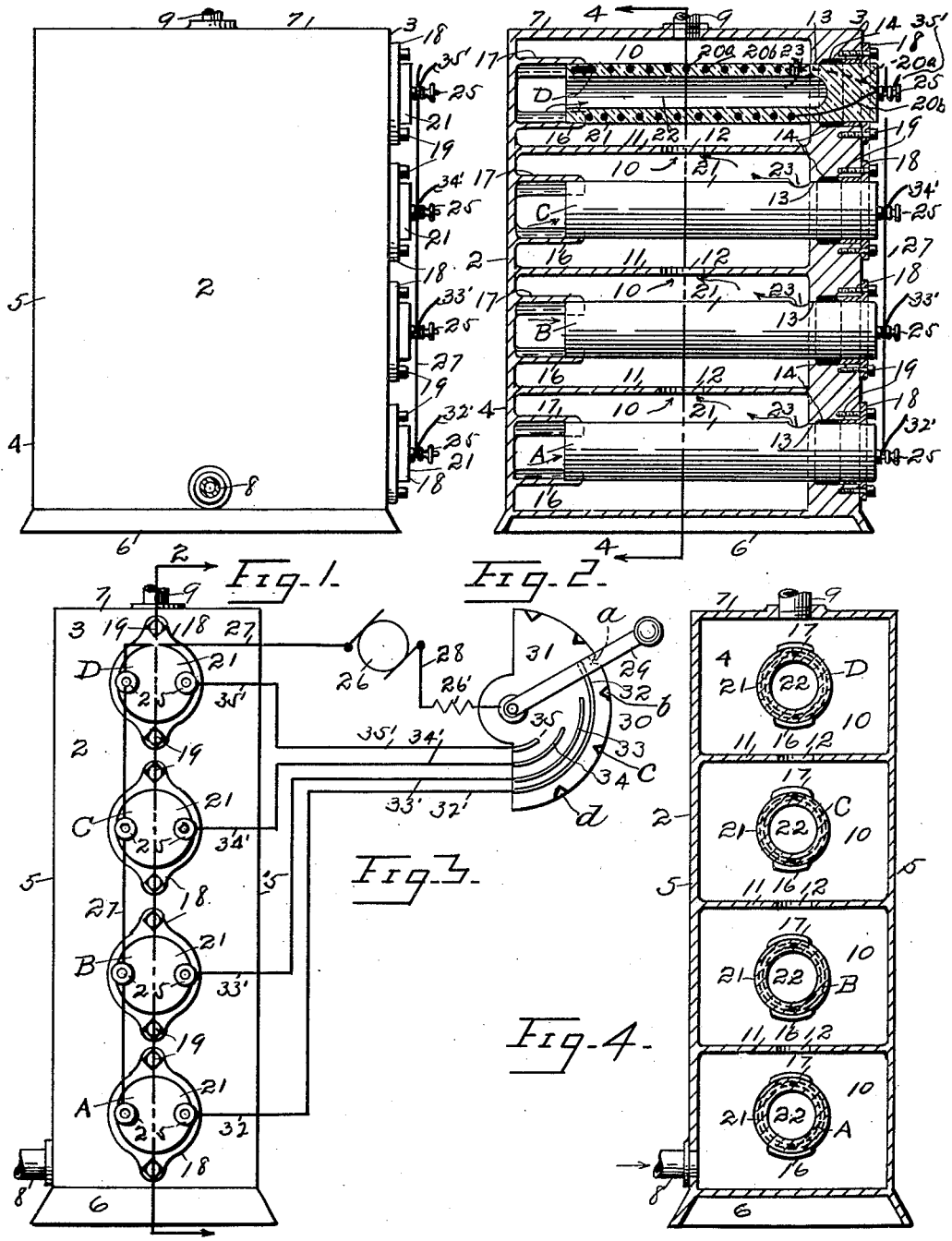

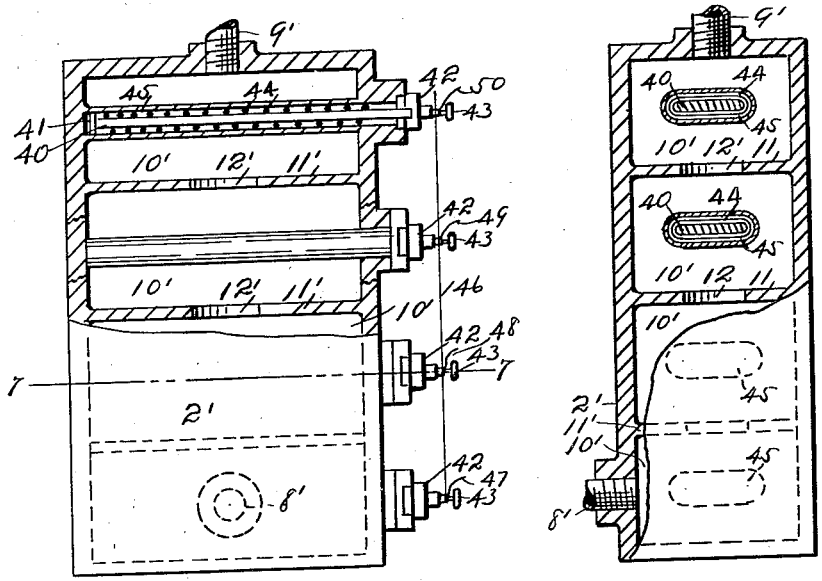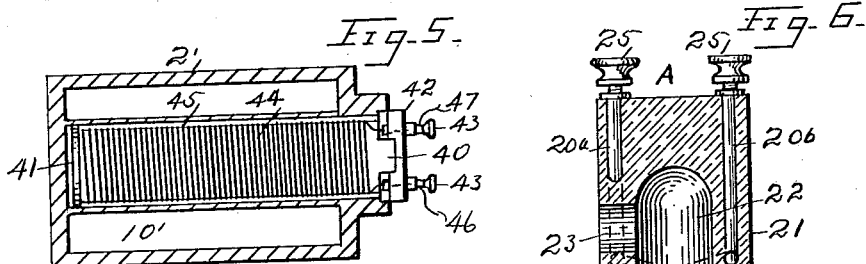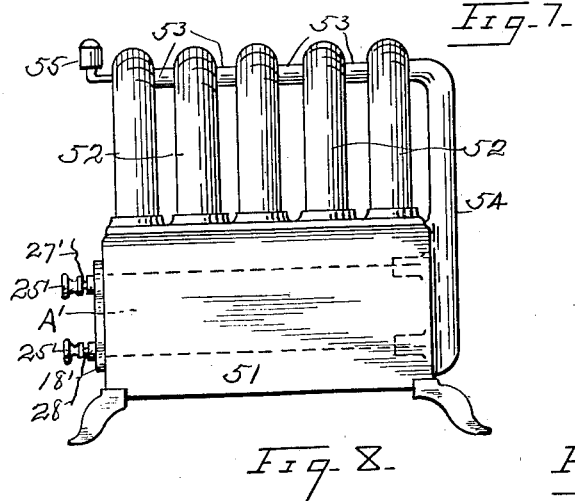

HARRY DE WALLACE, OF SYRACUSE, NEW YORK, ASSIGNOR OF ONE-HALF TO CARL GABRIELSON, OF SYRACUSE, NEW YORK.

ELECTRIC WATER-HEATER.

1,069,679.   Specification of Letters Patent.   Patented Aug. 12, 1913.

Application filed September 18, 1912. Serial No. 720,955.

*To all whom it may concern:*

Be it known that I, HARRY DE WALLACE, a citizen of the United States, residing at Syracuse, in the county of Onondaga and State of New York, have invented certain new and useful Improvements in Electric Water-Heaters, of which the following is a specification.

This invention relates to improvements in water heaters, designed for use in connection with the heating of buildings and plants, as well as for heating water for baths, cooking and the like.

The object of the invention is to provide a novel, simple, inexpensive and effective water heater, wherein the heating agent is electricity.

A further object is to provide a heater of the class, wherein a plurality of electric coils are disposed in separate compartments of a common boiler, in such manner that each coil is surrounded by water, and whereby any desired temperature may be produced, and a steady and even heat may be maintained with a small amount of current, and with a minimum of attention and care. And a further object is to provide simple means for controlling the electric current by which the coils are heated, as well as for determining the number of coils to be charged with the current during the heating intervals.

The various features of the invention will be understood from the detailed description which follows, and by reference to the accompanying drawings which form a part of the specification, and in which—

Figure 1 is a side elevation of the boiler or furnace in which the water is heated. Fig. 2 is a central vertical section, substantially on line 2—2 of Fig. 3; showing a number of compartments in the boiler, each of which is provided with an electric coil, one of the coils being in section. Fig. 3 is a front end elevation; showing the arrangement of the electrical connections; also showing the means for controlling the electric current. Fig. 4 is a vertical cross-section, taken on line 4—4 of Fig. 2. Fig. 5 is a partial side elevation and partial section of a modified form of heater; showing the electric coils disposed in integral metal pockets or sockets which prevent the water from reaching the coils. Fig. 6 is a partial front elevation and partial section of the same. Fig. 7 is a horizontal section, taken on line 7—7 of Fig. 5. Fig. 8 is an elevational view of another modified form of the heater; showing the boiler and radiator combined; also showing a single coil for heating the same. Fig. 9 is an enlarged view partly in elevation and partly in section; showing the construction and arrangement of the inclosed coil illustrated in Figs. 1, 2, 3 and 4.

In the drawings, 2 represents what will be designated as the boiler or furnace, which contains the water to be heated, and which may consist of any suitable material, but is preferably made of cast iron, in one part. The boiler 2 may be made in any form, but is preferably rectangular and upright, having a front wall 3, rear wall 4, side walls 5, a flaring bottom 6, and a top 7. The water to be heated enters the boiler through a supply pipe 8, which pierces one of the sides near the bottom, and the heated water is carried away from the boiler by means of a flow-pipe 9, which is threaded into the top 7. Pipes 8 and 9 may connect with the usual radiators (not shown) for heating the building, or the hot water may be supplied to baths, or used for any other purpose. In its preferred form, the boiler 2 is subdivided into a number of horizontal compartments or chambers 10, which are separated by floors or partitions 11, which are preferably cast with the sides and ends, and each floor is perforated centrally, as at 12, to allow the water to circulate freely from the lowermost to the uppermost chambers. By dividing the boiler into the long narrow compartments 10, a comparatively small body of water is exposed to each of the heating elements, which insures quicker and more effective heating, and also aids the circulation, as will be later explained.

13 represents a series of circular openings formed in the front wall 3 of the boiler, and these are arranged substantially in the center of the chambers 10.

The heating of the water in the boiler 2 is accomplished by means of a series of similar electric coils A, B, C, and D, one of which is disposed horizontally in each of the chambers 10. The coils are inserted through the openings 13, and extend to within a short distance of the rear wall 4. The inner ends of the coils are supported by integral brackets 16 which are carried by the rear wall, and the inner ends of the coils are held from displacement by means of guards 17. The outer ends of the openings 13 are counter-bored to receive packings 14, which are compressed for sealing the joints between the coils and the front of the boiler, by means of glands 18, which are perforated centrally to pass over the coils. The glands are held in place by bolts or screws 19, which are threaded into the thickened portion of the front wall 3. The tightening up of the bolts 19 forces the glands inwardly against the packing 14, and in this way the coils are held tightly in place, and at the same time the water cannot escape through the holes 13, as best seen in Fig. 2.

The heating coils A, B, C and D may be constructed in any suitable manner, but I prefer to employ coils which comprise a high resistance wire, such as German silver, which is first folded double so as to produce two strands, as $20^a$ and $20^b$. The wire after being folded as described, is wound into an open coil (see dotted lines Fig. 9). The wire $20^a$—$20^b$ is then embedded in porcelain, glass or other insulating and refractory substance 21, by any suitable method. The porcelain part 21 for a greater part of its length is preferably tubular, having a comparatively large bore 22, which is open at the rear end of the coil, so that the water may fill the said part. In order that the water in the coils may circulate when heated, each of the porcelain parts 21 is provided with an upwardly facing port or opening 23, which communicates with the bore 22 near its closed end. With this construction and arrangement, the wire of the coil is suitably insulated, and at the same time the insulation 21 comprises a highly refractory substance which readily conducts the heat. The part 21 being hollow provides both an inner and an outer heating surface comprising a comparatively large area, which renders the coils capable of readily and quickly heating the water in the boiler, the coils together with the insulation 21 may be of any size but they are preferably three or four inches in diameter, while the bore 22 is large enough to effect the free circulation of the water. The insulated heating coils for the entire length are submerged or immersed in the water of each compartment or chamber 10, and the water not only surrounds the coils, but also fills the hollow interiors of the armors 21. By disposing the coils horizontally in the chambers 10, the heat will rise the full length of the coils and will raise the temperature of the comparatively small bodies of water to its highest point more readily and quickly, and by the use of less current, than if the coils were disposed in any other manner. The ends of the wires $20^a$ and $20^b$ extend from the coil proper through the solid end portions of the cylinders 21 and connect with binding-posts 25, which are mounted upon the outer exposed ends of the said cylinders. The current for heating the coils A, B, C and D may be supplied from any source, as from a dynamo or generator 26, from which it is carried to the coils by means of a wire 27, which connects with the corresponding binding posts of the several coils.

28 represents a wire which extends from the generator 26 and connects with a lever 29 of a controller 30, which comprises a suitable base 31, upon which is mounted a series of arc-shaped contacts or terminals 32, 33, 34 and 35. The said contacts are preferably of different length, as shown, so that the lever 29 may be swung and set in different positions for engaging one or more of the contacts, for cutting-in and cutting-out the current from the corresponding coils of the heater. From the controller the current passes to the opposite binding-posts of the coils by means of wires $32'$, $33'$, $34'$ and $35'$.

Fig. 3 illustrates the complete heater and the current controlling device, in which the lever 29 is shown set in contact with the terminal 32, for supplying the electric current only to the lowermost coil A. When the controller lever 29 is set, as described, the coil A receives the current and heats the water in the lower chamber. As soon as the temperature of the water begins to rise the water will start to circulate through the cylinder 21 of the coil A, and will pass out of the port 23, thence upwardly through the port 12 in the adjacent partitions, and thence through the several chambers 10 until it reaches the pipe 9. If the heat produced by the coil A is not sufficient, the lever 29 may be swung downwardly until it contacts with the segment or terminal 33, which will charge the coil B and cause it to be heated to the same extent as the coil A. In practice, when first starting the heater, the lever 29 should be swung around to the position indicated by the letter $d$ on the controller, which will immediately charge the four coils, which will produce the greatest amount of heat. In a few minutes the water in the several compartments of the boiler will become hot and begin to circulate to and through the other parts of the system. When the whole system has been heated to the proper extent, the lever 29 may be swung upwardly to the position $c$, $b$, or $a$, as the case may be, for maintaining a uniform and steady heat. I have found that where the heating coils are inserted in a comparatively large body of water, as for instance, in the boiler 2, in case the partitions 11 are removed, there is a tendency for eddy-currents to be set up in the body of water, which not only retard, but seriously interfere with the proper circulation of the water to other parts of the heating system. By dividing the boiler into several long narrow compartments, as 10, wherein a comparatively small body of water is held, and then by providing a heating coil which is disposed horizontally in each chamber, I am able to quickly heat the water to a high temperature. The body of water in each compartment is too small to permit of any eddy-currents, and therefore the hot water will pass freely from each compartment by way of the ports 12 in the partitions 11, and thence circulate throughout the entire system. The water will then return at a lower temperature by way of the pipe 8 into the lowermost compartment 10. The flow or circulation of the water will thereafter be continuous, as long as the current is on one or more of the coils 21.

In Figs. 5, 6 and 7 I have shown a modified form of the heater, which comprises a boiler 2' having a number of water compartments 10', which are separated by partitions 11', the said compartments communicating with each other by means of ports 12'. The coils employed for heating the water in the modified device consist of iron or like oblong cores or plates 40, each of which is fitted at its inner end with a porcelain or like insulating part 41. The outer end of each coil is fitted with a porcelain head 42 which supports binding posts 43. The heating coils proper consist of wires 44, one of which is wound around each core 40, and the ends of the wire connect with the binding post 43. Any suitable insulating material may be applied to the plates 40 before the wire is wound around them. 45 represents a horizontally arranged pocket or cavity which is disposed centrally in each of the chambers 10', the walls of which are preferably cast integrally with the front and rear walls of the boiler. The only opening in the pockets 45 occurs at the front end of the boiler. The heating coils are inserted in the open ends of the pockets 45, as shown in Figs. 5, 6 and 7. The arrangement of the pockets 45 is such that the water contained in the compartments 10' entirely surrounds the pockets and coils, but the water cannot reach the coils. The current for heating the coils is supplied by wires 46, 47, 48, 49 and 50, and the wires are preferably connected up as shown in Fig. 3. In this modified device, the heat from the coils which are comparatively broad, is imparted first to the thin walls of the pockets 45, and then to the water surrounding the pockets. The coils may be applied to and removed from the pockets at will without disturbing or drawing off the water. In Fig. 8 I have shown still another modified form of my heater, which consists of a tank or boiler 51, having but a single compartment, which is intended to hold water, and which is arranged to receive a single coil A' like that shown in Figs. 2 and 9, which is held in place by a gland 18', and which is supplied with current by wires 27' and 28'. 52 represents a series of hollow radiator sections or coils which are mounted upon and communicate at their lower end with the boiler 51. The upper ends of the tubes 52 are connected by means of a pipe or a series of nipples 53, and 54 represents a downwardly extending portion of the pipe 53 which connects with the rear end of the boiler 51. When the current is turned on to the coil A' for heating the water in the boiler 51, the water will circulate or flow upwardly through the radiator sections 52, and from the said sections the water will flow through the pipes 53 and 54 back into the boiler. In case the water becomes too hot or boils and produces steam, the pressure may be reduced or relieved by means of a blow-off valve 55 which is connected to one of the coils 52. The combined heater and radiator shown in Fig. 8 is portable and is intended especially for heating a single room. The wires 27' and 28' may be attached to a common electric socket for obtaining the current for operating the combined device.

My water heater is extremely simple and practical, and when the coils A, B, C and D are properly constructed and applied, the requisite heat may be produced by the consumption of a small amount of current.

Having thus described my invention, what I claim as new and desire to secure by Letters Patent, is—

1. In a water heater, a boiler having a number of superposed chambers connected for the passage of water, each chamber having an opening in one end, a heating element comprising a coil inserted through the opening of each chamber and immersed in the water carried by the chamber, a source of current for heating said coils, and means for turning on and turning off the current.

2. A water heater, comprising an upright boiler for containing water to be heated, said boiler having spaced openings arranged one above the other, an electric heating coil inserted in each opening and extending into and surrounded by the water in the boiler, a source of current for heating said coils, means for sealing the openings in the boiler and for holding the coils in place, and means for insulating said coils from the water in the boiler.

3. The combination with a boiler for containing water to be heated, said boiler having a number of separate compartments, and said boiler having spaced openings in one side leading to said compartments, of an electric heating coil inserted through each opening in the boiler and immersed in the water of a compartment, means for insulating the wire of each coil from the water in the boiler, and a source of electric current for energizing said coils.

4. In a water heater, a boiler subdivided horizontally for providing a plurality of compartments adapted to be filled with water and communicating with each other, an electric coil inserted horizontally in each compartment and surrounded by the water, a pipe for supplying water at low temperature to the lowermost compartment, a pipe for carrying away the hot water from the uppermost compartment, and means for supplying an electric current to said coils.

5. The combination of a boiler having a number of compartments arranged one above the other, the adjacent compartments communicating for the passage of water, a heating element immersed in the water of each compartment, said heating elements comprising insulated electric coils, a source of electric current for energizing said coils, and means for energizing first the lowermost and then the uppermost coils for varying the heating of the water in the boiler.

6. An electric water heater, comprising an upright boiler divided into a number of compartments communicating with each other, a pipe for supplying water to the lowermost compartment, a pipe for carrying the heated water away from the uppermost compartment, a wire coil disposed horizontally and adapted to heat the water in each compartment, hollow cylindrical insulating parts in which the wire coils are embedded, said insulating parts being adapted to be immersed in the water, and also to be filled with water, each insulating part having one open end, and having an upwardly facing port near the other end for the passage of the heated water, terminals for each coil carried by each insulating part disposed outside of the boiler, wires connecting said terminals with a source of electric current, and a device for controlling the electric current supplied to the coils.

7. In a water heater, a boiler having a plurality of water compartments arranged one above and communicating with each other, each compartment having an opening in one end, a series of insulated coils inserted through the openings in the compartments and projecting horizontally into the water, the said coils being hollow for permitting a portion of the water to be heated within the coils, binding posts mounted on the outer end of each coil, and a series of wires connecting the coils with a source of electric current for heating the coils.

8. In an electric water heater, a boiler subdivided into a number of similar compartments arranged one above the other each communicating with the other, and each having an opening in one end, a wire coil for each compartment, each coil comprising a single wire folded double and wound so as to bring the ends outside of the boiler, an insulating material formed into a tube having walls of a thickness suitable for embedding the wires of the coils, for preventing the coils from contacting with the water, a bracket for supporting one end of each coil, and a gland for supporting the opposite end of each coil.

9. In a water heater, the combination with a boiler having a number of compartments arranged one above the other and communicating with each other, of an electric coil disposed horizontally in each compartment, said coils being inserted through openings in the corresponding ends of said compartments, a refractory insulating substance for inclosing the coils so as to prevent their contacting with the water, and means comprising a packing and a gland for sealing the opening in each compartment and also for holding the coils in place.

10. In a water heater, a boiler divided into a number of compartments arranged one above the other, the adjacent compartments communicating by means of a port, and each of said compartments having an opening in one end, a series of coils for heating the water, one coil disposed in each compartment and immersed in the water, a tubular insulating part in which each coil is embedded, each insulating part having an upwardly facing port for the circulation of the water, which is heated within the coil, a packing for sealing the opening in the end of each compartment, and a gland surrounding each insulating part and adapted to compress the packing for holding the coil in place.

11. The combination of a boiler divided into a number of compartments arranged one above the other and communicating for the circulation of the water from the lowermost to the uppermost compartments, a heating element disposed in and adapted to heat the water in each of said compartments, said heating elements being inserted horizontally through one end of the boiler, said heating elements comprising coils of wire embedded in an insulating material, and brackets, carried by the opposite end of the boiler for supporting one end of said heating elements.

In testimony whereof I affix my signature in presence of two witnesses.

HARRY DE WALLACE.

Witnesses:
E. G. BURR,
E. C. WRIGHT.